United States Patent
Kuo et al.

(10) Patent No.: US 11,252,331 B2
(45) Date of Patent: Feb. 15, 2022

(54) OPTICAL SYSTEM

(71) Applicant: TDK TAIWAN CORP., Taoyuan (TW)

(72) Inventors: Chen-Chi Kuo, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/033,025

(22) Filed: Sep. 25, 2020

(65) Prior Publication Data

US 2021/0014424 A1 Jan. 14, 2021

Related U.S. Application Data

(63) Continuation of application No. 16/520,048, filed on Jul. 23, 2019, now Pat. No. 10,812,724.

(60) Provisional application No. 62/703,147, filed on Jul. 25, 2018.

(30) Foreign Application Priority Data

Jul. 9, 2019 (CN) .......................... 201910614960.X

(51) Int. Cl.
*H04N 5/225* (2006.01)
*H04N 5/232* (2006.01)

(52) U.S. Cl.
CPC ....... *H04N 5/23287* (2013.01); *H04N 5/2253* (2013.01); *H04N 5/2254* (2013.01); *H04N 5/23258* (2013.01)

(58) Field of Classification Search
CPC ........... H04N 5/23287; H04N 5/23258; H04N 5/2254; H04N 5/2253; H04N 5/2257
See application file for complete search history.

(56) References Cited

U.S. PATENT DOCUMENTS

| 2010/0149668 | A1* | 6/2010 | Wade ....................... G02B 7/08 359/824 |
| 2011/0269317 | A1* | 11/2011 | Knoedgen .............. H01R 41/00 439/32 |
| 2016/0209617 | A1* | 7/2016 | Mitani ................... G02B 7/023 |

\* cited by examiner

*Primary Examiner* — Mekonnen D Dagnew
(74) *Attorney, Agent, or Firm* — Muncy, Geissler, Olds & Lowe, P.C.

(57) ABSTRACT

A photosensitive element driving mechanism includes a fixed assembly, a first movable assembly, a photosensitive element and a first driving assembly. The first movable assembly includes a circuit member, and the circuit member includes a circuit member body and a movable cantilever. The photosensitive element is configured to receive light along an optical axis. The photosensitive element is disposed on and is electrically connected to the circuit member. The first driving assembly is configured to drive the first movable assembly to move relative to the fixed assembly. The movable cantilever has a first segment extending in a direction different from the optical axis, the first segment is electrically connected to the photosensitive element and the fixed assembly, and the first movable assembly moves relative to the fixed assembly through the movable cantilever. There is a gap between the first movable assembly and the fixed assembly.

20 Claims, 10 Drawing Sheets

OPTICAL SYSTEM

CROSS REFERENCE TO RELATED APPLICATIONS

This application is a Continuation of pending U.S. patent application Ser. No. 16/520,048, filed Jul. 23, 2019 and entitled "PHOTOSENSITIVE ELEMENT DRIVING MECHANISM", and claims the benefit of U.S. Provisional Application No. 62/703,147, filed Jul. 25, 2018, and China Patent Application No. 201910614960.X, filed Jul. 9, 2019, the entirety of which are incorporated by reference herein.

BACKGROUND OF THE DISCLOSURE

Field of the Disclosure

The present disclosure relates to a photosensitive element driving mechanism, and in particular it relates to a photosensitive element driving mechanism for driving a photosensitive element.

Description of the Related Art

As technology has progressed, many kinds of electronic devices such as tablet computers and smartphones have begun to include the functionality of digital photography or video recording. A user can operate the electronic device to capture various images with an photosensitive element driving mechanism (such as a camera module) that is included in the electronic device, and therefore electronic devices equipped with camera modules have gradually become popular.

Today's design of electronic devices continues to move toward the trend of miniaturization so that the various components of the camera module or its structure must also be continuously reduced, so as to achieve the purpose of miniaturization. In general, a driving mechanism of the camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of miniaturization.

Therefore, how to design a camera module that can make the image clearer is a topic nowadays that needs to be discussed and solved.

BRIEF SUMMARY OF THE DISCLOSURE

Accordingly, one objective of the present disclosure is to provide a photosensitive element driving mechanism to solve the above problems.

According to some embodiments, a photosensitive element driving mechanism is provided and includes a fixed assembly, a first movable assembly, a photosensitive element and a first driving assembly. The fixed assembly has a base plate. The first movable assembly includes a circuit member movable relative to the fixed assembly, and the circuit member includes a circuit member body and a movable cantilever. The photosensitive element is configured to receive light traveling along an optical axis. The photosensitive element is disposed on the circuit member body and is electrically connected to the circuit member. The first driving assembly is configured to drive the first movable assembly to move relative to the fixed assembly. The movable cantilever has a first segment extending in a direction different from the optical axis, the first segment is electrically connected to the photosensitive element and the fixed assembly, and the first movable assembly moves relative to the fixed assembly through the movable cantilever. There is a gap between the first movable assembly and the fixed assembly.

According to some embodiments, the first driving assembly has a shape memory alloy.

According to some embodiments, the photosensitive element driving mechanism further includes a position sensing assembly configured to sense motion of the first movable assembly relative to the fixed assembly.

According to some embodiments, the photosensitive element driving mechanism further includes a second movable assembly and a second driving assembly. The second movable assembly is configured to hold an optical component, wherein the second movable assembly is movable relative to the fixed assembly. The second driving assembly is configured to drive the second movable assembly to move relative to the fixed assembly, wherein the second driving assembly includes at least one second driving magnet component. The position sensing assembly is disposed on the first movable assembly and corresponds to the second driving magnet component.

According to some embodiments, the second driving magnet component is disposed on the fixed assembly, and the position sensing assembly includes at least three magnetic sensors configured to sense motion of the photosensitive element relative to the base plate.

According to some embodiments, the photosensitive element driving mechanism further includes a second movable assembly and a second driving assembly. The second movable assembly is configured to hold an optical component, wherein the second movable assembly is movable relative to the fixed assembly. The second driving assembly is configured to drive the second movable assembly to move in a first direction relative to the fixed assembly. The first driving assembly is disposed between the first movable assembly and the second movable assembly, and when viewed in a direction of the optical axis, the first driving assembly partially overlaps the first movable assembly.

According to some embodiments, the photosensitive element driving mechanism further includes a third driving assembly configured to drive the second movable assembly to move in a second direction relative to the fixed assembly, and the second direction is not parallel to the first direction.

According to some embodiments, when the third driving assembly includes a third driving coil disposed between the first movable assembly and the second movable assembly, and when viewed in the direction of the optical axis O, the third driving coil partially overlaps the first movable assembly.

According to some embodiments, the first driving assembly is disposed between the third driving coil and the first movable assembly.

According to some embodiments, a size of the first segment in a direction of the optical axis is greater than a size of the first segment in a direction perpendicular to the optical axis.

According to some embodiments, the circuit member has a first surface continuously distributed over the circuit member body and the first segment, wherein the first surface on the circuit member body faces the photosensitive element, and the first surface on the first segment is parallel to the optical axis.

According to some embodiments, the first movable assembly further includes a first frame configured to accommodate the photosensitive element, and the first frame has a recessed portion corresponding to the first segment.

According to some embodiments, the movable cantilever further has a second segment, and the second segment and the first segment extend in different directions.

According to some embodiments, when viewed in a direction perpendicular to the optical axis, the first segment partially overlaps the first movable assembly.

According to some embodiments, the circuit member has a plurality of first segments disposed on two sides of the first movable assembly.

According to some embodiments, the circuit member has a plurality of second segments disposed on two sides of the first movable assembly, and the first segments and the second segments extend in different directions.

According to some embodiments, the fixed assembly further includes an outer frame, the outer frame has a first top surface facing the first movable assembly, and when viewed in a direction of the optical axis, the first top surface partially overlaps the first segment.

According to some embodiments, the fixed assembly further includes a base, the first driving assembly is disposed between the base and the first movable assembly, and the base is disposed on the first top surface, wherein when viewed in the direction of the optical axis, the base partially overlaps the first top surface.

According to some embodiments, the outer frame further has a second top surface, and a distance between the second top surface and the first movable assembly is greater than a distance between the first top surface and the first movable assembly.

According to some embodiments, the outer frame further has a side wall parallel to the optical axis, and when viewed in the direction of the optical axis, the circuit member partially overlaps the side wall.

The present disclosure provides a photosensitive element driving mechanism which has a first driving assembly and a first movable assembly. The first movable assembly is held by the first driving assembly and is suspended in the outer frame of the fixed assembly. The photosensitive element is disposed on the circuit member of the first movable assembly, and the first driving assembly is configured to drive the circuit member and the photosensitive element to move relative to the fixed assembly, so as to achieve the purpose of optical image stabilization.

Furthermore, in some embodiments, the photosensitive element driving mechanism may further include a third driving assembly configured to drive the holder of the second movable assembly and the optical component to move along the XY plane relative to the fixed assembly, so as to further enhance the effect of optical image stabilization.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
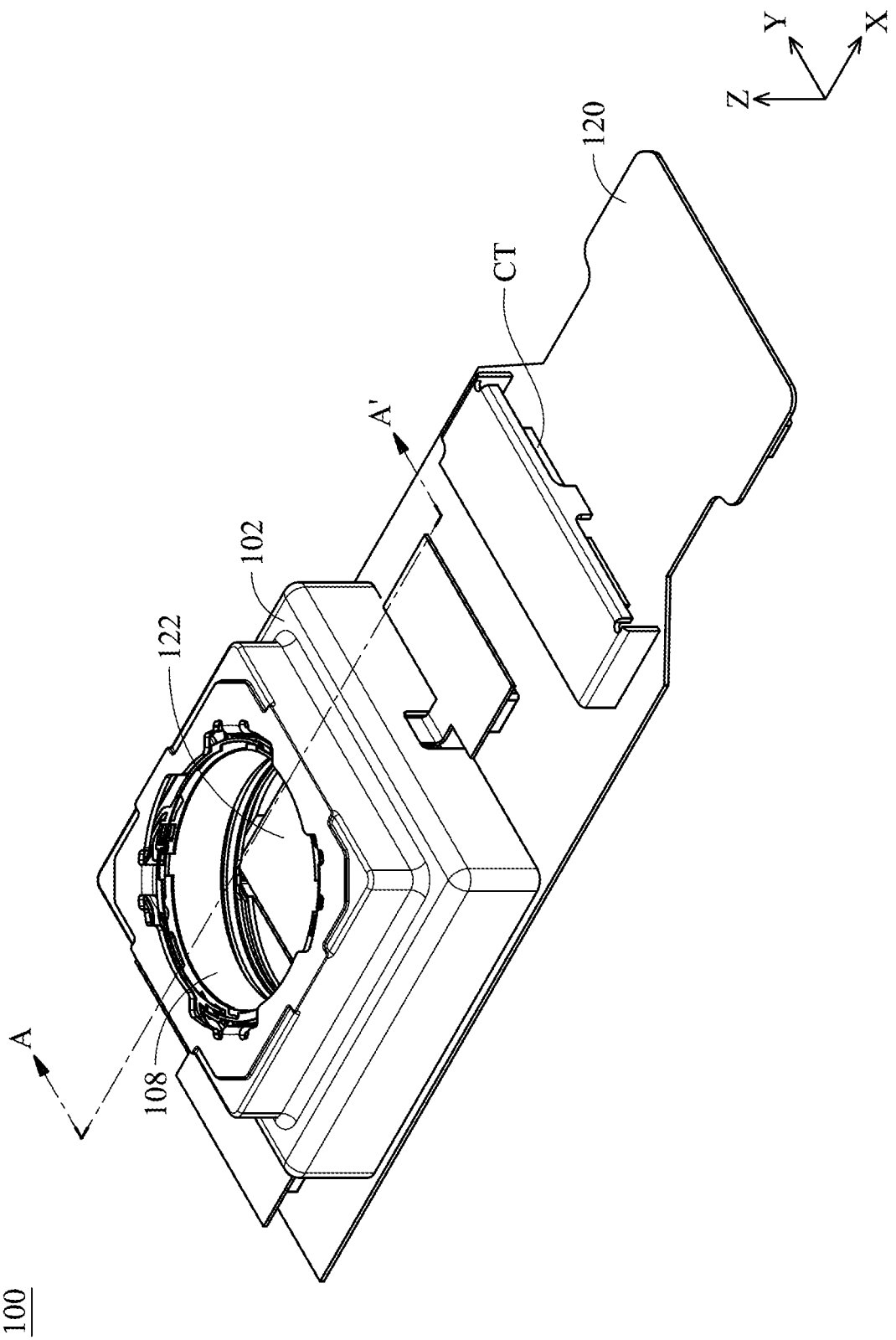
FIG. 1 shows a schematic diagram of a photosensitive element driving mechanism 100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "first", "second", "third", "fourth", and the like are merely generic identifiers and, as such, may be interchanged in various embodiments. For example, while an element may be referred to as a "first" element in some embodiments, the element may be referred to as a "second" element in other embodiments.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
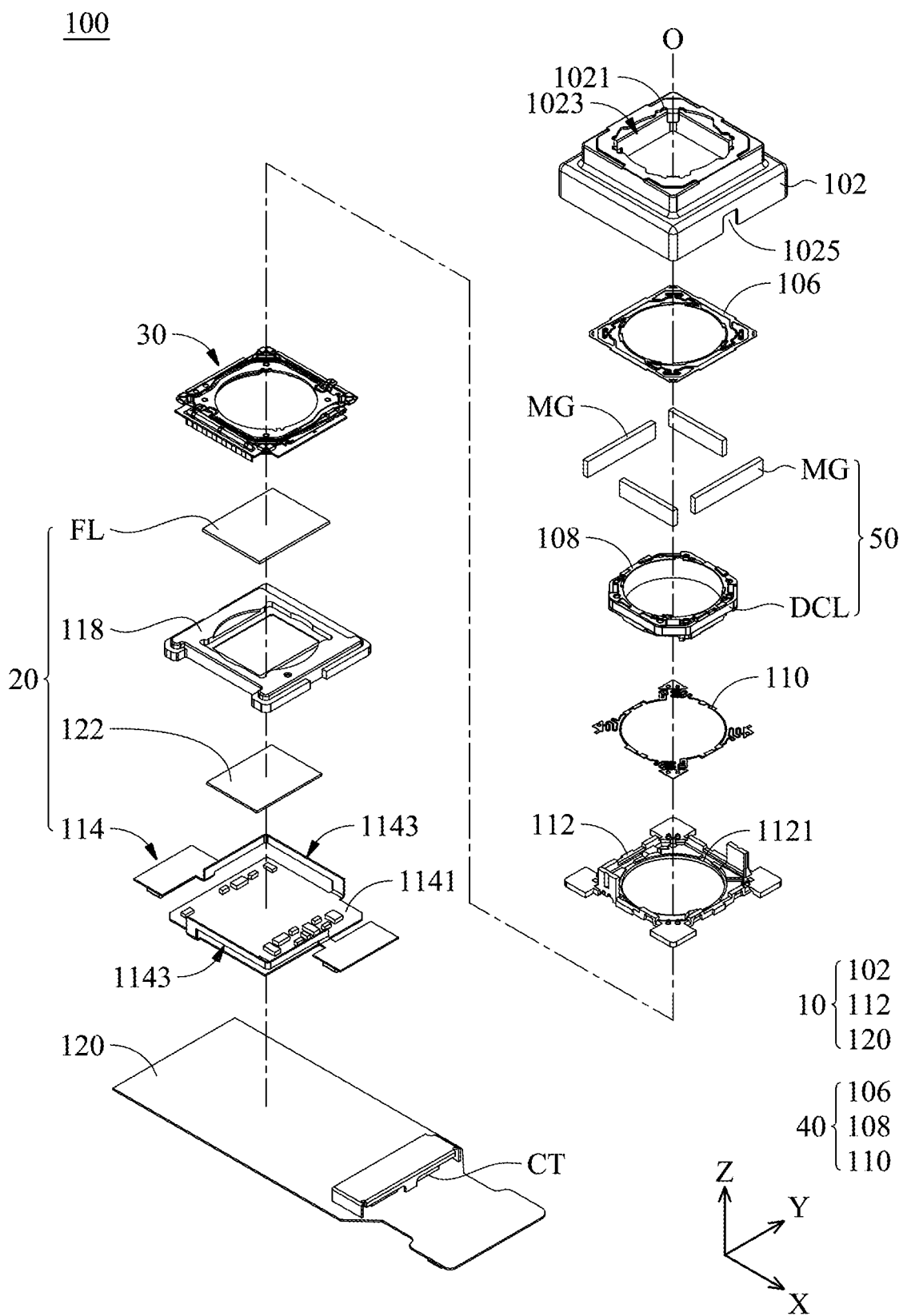
FIG. 2 shows an exploded diagram of the photosensitive element driving mechanism 100 according to the embodiment of the present disclosure.
Figure 3:
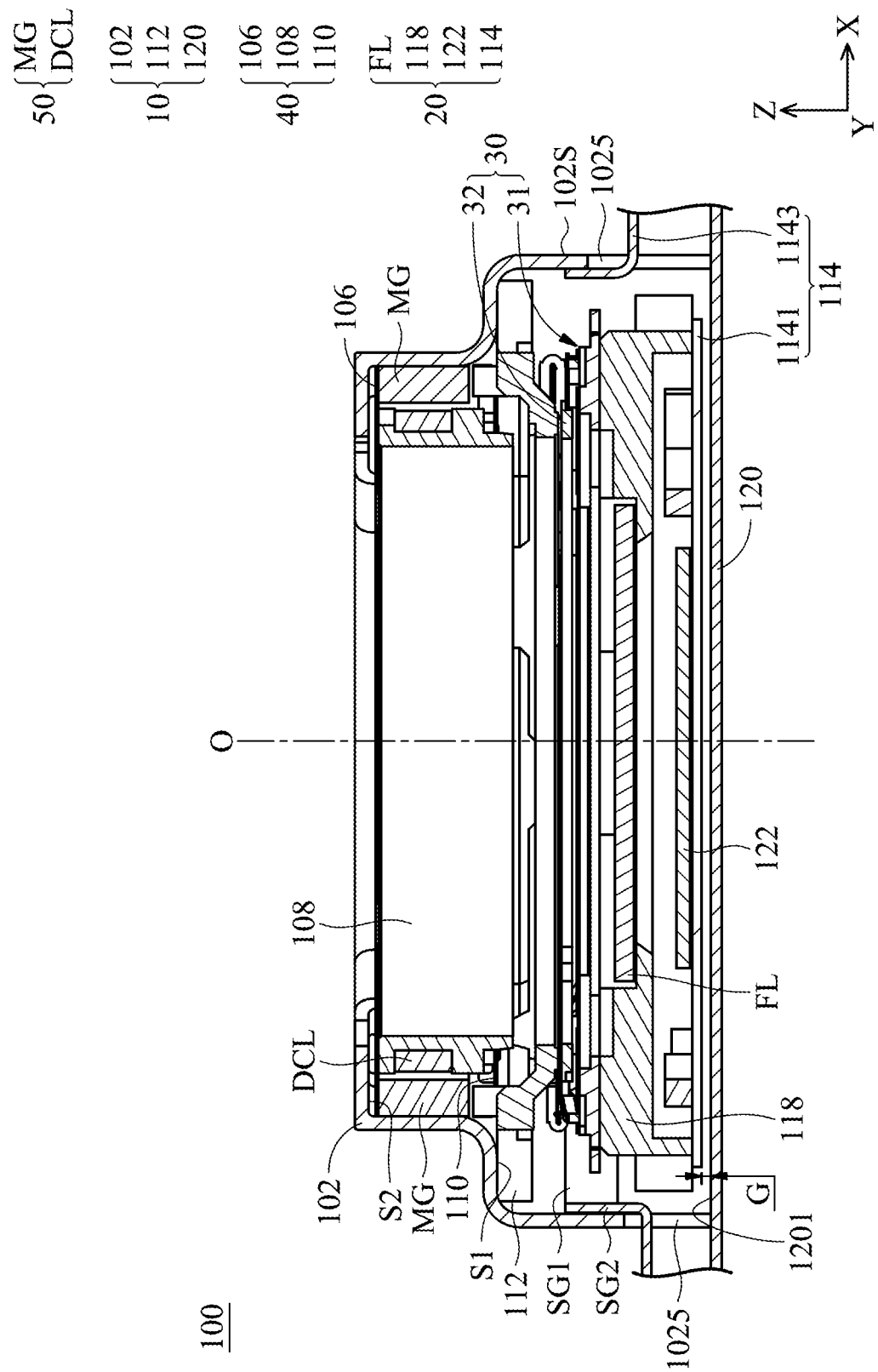
FIG. 3 shows a cross-sectional view along line A-A' in FIG. 1 according to the embodiment of the present disclosure.

Please refer to FIG. 1 to FIG. 3. FIG. 1 shows a schematic diagram of an photosensitive element driving mechanism 100 according to an embodiment of the present disclosure, FIG. 2 shows an exploded diagram of the photosensitive element driving mechanism 100 according to the embodiment of the present disclosure, and FIG. 3 shows a cross-sectional view along line A-A' in FIG. 1 according to the embodiment of the present disclosure. The photosensitive element driving mechanism 100 can be an optical camera system and can be configured to hold and drive an optical component (not shown in the figures). The photosensitive element driving mechanism 100 can be installed in different electronic devices or portable electronic devices, such as a smartphone or a tablet computer, for allowing a user to perform the image capturing function. In this embodiment, the photosensitive element driving mechanism 100 can be a voice coil motor (VCM) with an auto-focusing (AF) function, but it is not limited thereto. In other embodiments, the photosensitive element driving mechanism 100 can also perform the functions of auto-focusing and optical image stabilization (OIS).

As shown in FIG. 1 to FIG. 3, in the embodiment, the photosensitive element driving mechanism 100 mainly includes a fixed assembly 10, a first movable assembly 20, a first driving assembly 30, and a second movable assembly 40, a second driving assembly 50 and a control circuit CT. The first driving assembly 30 is configured to drive the first movable assembly 20 to move relative to the fixed assembly 10, and the second driving assembly 50 is configured to drive the second movable assembly 40 to move relative to the fixed assembly 10. The control circuit CT is configured to control operation of the first driving assembly 30 and the second driving assembly 50.

In this embodiment, the fixed assembly 10 can include an outer frame 102, a base 112, and a base plate 120. The second movable assembly 40 can include a first elastic member 106, a holder 108, and a second elastic member 110. The second driving assembly 50 can include a plurality of magnetic elements MG (the second magnetic driving elements), and a driving coil DCL.

As shown in FIG. 2, the outer frame 102 has a hollow structure, and an outer frame opening 1021 is formed on the outer frame 102. A base opening 1121 is formed on the base 112. The center of the outer frame opening 1021 corresponds to an optical axis O of optical component (not shown) which is held by the holder 108. The base opening 1121 corresponds to an image sensing element (the photosensitive element 122) disposed below the base 112. External light can enter the outer frame 102 through the outer frame opening 1021, and then to be received by the photosensitive element 122 after traveling through the optical component and the base opening 1121, so as to generate a digital image signal.

Furthermore, the outer frame 102 can have an accommodating space 1023 configured to accommodate the first movable assembly 20, the first driving assembly 30, the second movable assembly 40, and the second driving assembly 50. It should be noted that the outer frame 102 is fixedly disposed on the base plate 120, and the control circuit CT is disposed outside the outer frame 102 and disposed on the base plate 120, but it is not limited thereto. In other embodiments, the control circuit CT can be disposed in the accommodating space 1023 of the outer frame 102.

In this embodiment, the second driving assembly 50 includes four magnetic elements MG, and the shape of the magnetic elements MG may be a long strip-shaped structure, but the number and shape of the magnetic elements MG are not limited thereto. Furthermore, the magnetic element MG can be a multi-pole magnet.

As shown in FIG. 2 and FIG. 3, the magnetic elements MG are fixedly disposed on the inner wall surface of the outer frame 102. In this embodiment, the driving coil DCL may be a winding coil and may be disposed around the holder 108, and the driving coil DCL corresponds to the plurality of magnetic elements MG. When the driving coil DCL is provided with electricity, the driving coil DCL acts with the plurality of magnetic elements MG generate to an electromagnetic force to drive the holder 108 and the optical component to move in a first direction relative to the base 112, such as along the direction of the optical axis O (the Z-axis).

In this embodiment, the first elastic member 106 is disposed on the magnetic elements MG, the outer portion of the first elastic member 106 is fixed to the magnetic elements MG (or the outer frame 102), and the outer portion of the second elastic member 110 is fixed to corners of the base 112. In addition, the inner portions of the first elastic member 106 and the second elastic member 110 are respectively connected to the upper side and the lower side of the holder 108, so that the holder 108 can be suspended in the outer frame 102 (as shown in FIG. 3). Accordingly, the second driving assembly 50 can drive the holder 108 to move relative to the fixed assembly 10.

As shown in FIG. 3, the first driving assembly 30 is disposed between the first movable assembly 20 and the second movable assembly 40. When viewed in the direction of the optical axis O, the first driving assembly 30 partially overlaps the first movable assembly 20. Furthermore, the outer frame 102 has a first top surface S1, a second top surface S2 and a side wall 102S. The first top surface S1 faces the first movable assembly 20, and the base 112 is fixed to the first top surface S1. In addition, the first driving assembly 30 is disposed between the base 112 and the first movable assembly 20, and when viewed in the direction of the optical axis O, the base 112 partially overlaps the first top surface S1.

As shown in FIG. 3, the distance between the second top surface S2 and the first movable assembly 20 is greater than the distance between the first top surface S1 and the first movable assembly 20 (in the direction of the optical axis O). The side wall 102S is parallel to the optical axis O, and when viewed in the direction of the optical axis O, the circuit member 114 partially overlaps the side wall 102S.

In this embodiment, the first movable assembly 20 can include a filter FL, a first frame 118, a photosensitive element 122, and a circuit member 114. The filter FL is disposed on the first frame 118 and configured to filter the light received by the photosensitive element 122. The circuit member 114 includes a circuit member body 1141, and the photosensitive element 122 is disposed between the circuit member 114 and the first driving assembly 30. Specifically, the photosensitive element 122 is disposed on the circuit member body 1141 and is electrically connected to the circuit member body 1141.

Furthermore, the first frame 118 is configured to accommodate the photosensitive element 122, and the first frame 118 can protect the circuit member body 1141 and the photosensitive element 122 so as to prevent the photosensitive element 122 from being damaged due to collisions with other components when the first movable assembly 20 moves.

Figure 4:
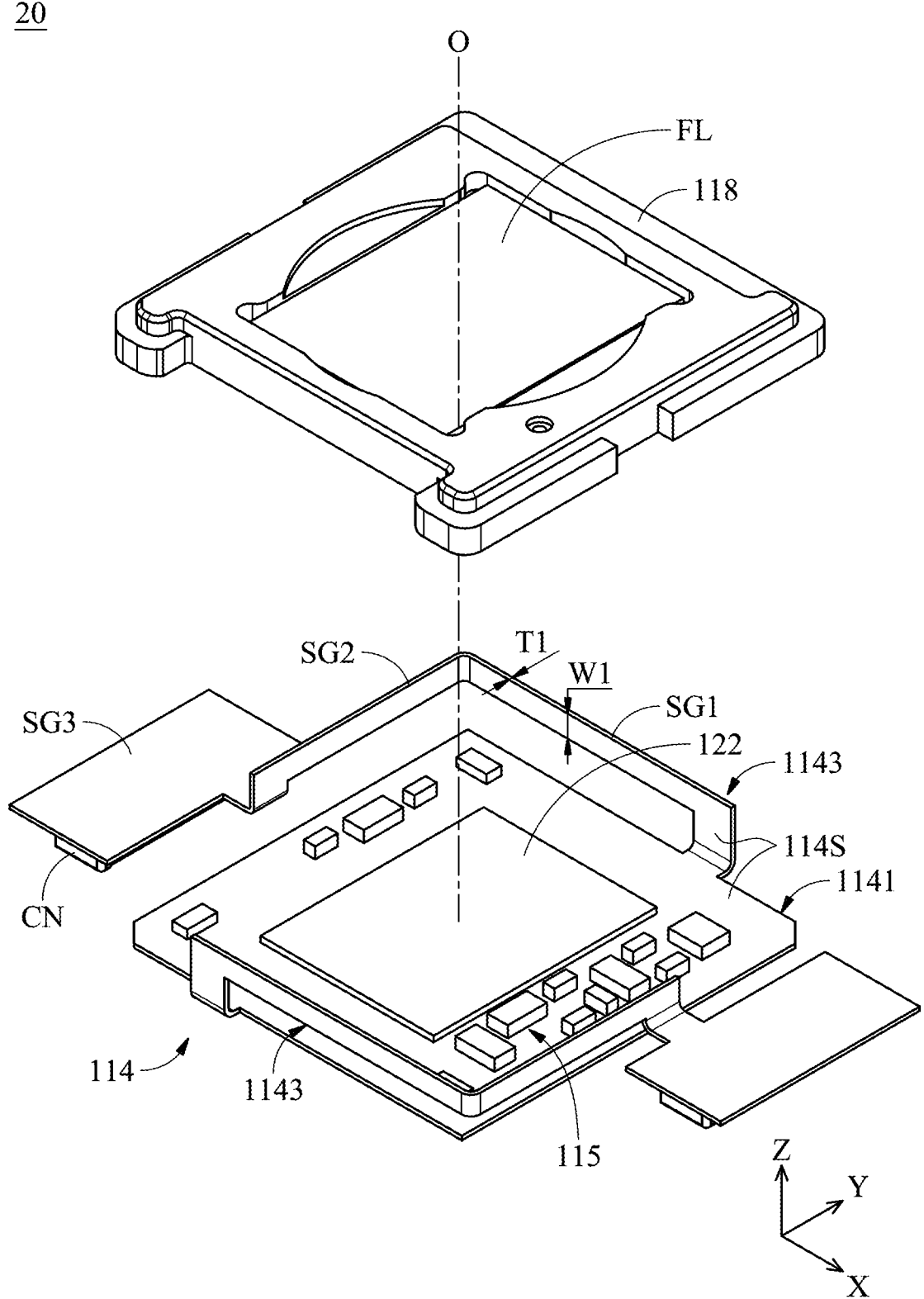
FIG. 4 is an exploded diagram of the first movable assembly 20 according to an embodiment of the present disclosure. In this embodiment.

Please refer to FIG. 2 to FIG. 4 together. FIG. 4 is an exploded diagram of the first movable assembly 20 according to an embodiment of the present disclosure. In this embodiment, the circuit member 114 can include a plurality of movable cantilevers 1143. For example, the circuit member 114 in FIG. 4 includes two movable cantilevers 1143 connected to the circuit member body 1141 and disposed on two sides of the circuit member body 1141. By providing two movable cantilevers 1143 on two sides of the circuit member body 1141, the overall structure of the first movable assembly 20 can be symmetrical and easier to achieve balance.

As shown in FIG. 4, each movable cantilever 1143 can have a first segment SG1, a second segment SG2, and a connecting portion SG3. The first segment SG1 and the second segment SG2 extend along directions different from the optical axis O (for example, along the X-axis or the Y-axis), and the second segment SG2 and the first segment SG1 extend in different directions.

One end of the first segment SG1 is connected to the circuit member body 1141, and the other end of the first segment SG1 is connected to the second segment SG2. The second segment SG2 is connected between the connecting portion SG3 and the first segment SG1, and the connecting portion SG3 is fixedly connected to the base plate 120 so that the circuit member body 1141 of the first movable assembly 20 can move relative to the fixed assembly 10 by the movable cantilever 1143.

Furthermore, the circuit member 114 may have a first surface 114S continuously distributed over the circuit member body 1141, the first segment SG1, the second segment SG2, and the connecting portion SG3. The first surface 114S on the circuit member body 1141 faces the photosensitive element 122, and the first surface 114S on the first segment SG1 or that on the second segment SG2 is parallel to the optical axis O.

As shown in FIG. 4, the size (a width W1) of the first segment SG1 in the direction of the optical axis O is greater than the size (a thickness Ti) of the first segment SG1 in a direction (the Y-axis) perpendicular to the optical axis O. Based on such a structural design, a portion of the circuit member 114 can be elastic so as to facilitate movement of the circuit member body 1141 in a direction perpendicular to the optical axis O.

When the first driving assembly 30 drives the circuit member body 1141 to move in a first moving direction (for example, the Y-axis), the amount of deformation of the first segment SG1 is greater than the amount of deformation of the second segment SG2. When the first driving assembly 30 drives the circuit member body 1141 to move in a second moving direction (for example, the X-axis), the amount of deformation of the first segment SG1 is smaller than the amount of deformation of the second segment SG2, and the first moving direction is not parallel to the second moving direction.

In this embodiment, the circuit member 114 can be a flexible printed circuit (FPC) board, thereby improving the mechanical strength of the circuit member 114 and simplifying the manufacturing process. Furthermore, based on the design of the first segment SG1 and the second segment SG2, the local plasticity of the circuit member 114 can be increased, and the reliability of the circuit member 114 can be further improved.

In some embodiments, the circuit member body 1141 and the movable cantilevers 1143 are integrally formed in one piece and are made of a flexible material, and the photosensitive element driving mechanism 100 may further include a plate body (not shown) connected to the bottom of the circuit member body 1141. The plate body may be a metal plate, which can increase the rigidity of the circuit member body 1141, and the metal plate can promote the heat dissipation of the circuit member 114 by heat conduction.

In addition, in some embodiments of the present disclosure, the circuit member body 1141 may also be made of a rigid material, and the movable cantilevers 1143 are made of a flexible material. Therefore, the purpose of increasing the rigidity of the circuit member body 1141 and the flexibility of the movable cantilevers 1143 can be achieved at the same time.

As shown in FIG. 4, a connector CN can be disposed on the bottom of the connecting portion SG3, the base plate 120 may be a printed circuit board, and the connector CN is configured to be connected to a connector (not shown in the figure) on the base plate 120. It should be noted that the circuit member 114 may have at least a first circuit layer and a second circuit layer (not shown), and the first circuit layer and the second circuit layer are distributed on different planes. For example, the first circuit layer is adjacent to the first surface 114S, and the second circuit layer is farther away from the first surface 114S than the first circuit layer.

As a result, the photosensitive element 122 and a plurality of electronic components 115 on the circuit member body 1141 can be electrically connected to the movable cantilever 1143, and are electrically connected to the base plate 120 through wires of the first circuit layer and the second circuit layer of the movable cantilever 1143.

In addition, in this embodiment, the first driving assembly 30 and the second driving assembly 50 can also be electrically connected to the circuit member 114, and are electrically connected to the base plate 120 and the control circuit CT on the base plate 120 through the circuit member 114.

It should be noted that, in some embodiments, in order to reduce the area of the base plate 120, the control circuit CT may also be disposed on the circuit member body 1141, and is electrically connected to the base plate 120 and a controller or a processor of the electronic device through the wires of the first circuit layer and the second circuit layer of the movable cantilever 1143, so as to achieve the purpose of miniaturization.

In some embodiments, only the photosensitive element 122 is disposed on the circuit member body 1141, thereby increasing the area of the photosensitive element 122 and improving the photographing effect.

In addition, in some embodiments, the control circuit CT can also be disposed in the outer frame 102 and is adjacent to the second movable assembly 40, so that the area of the photosensitive element 122 can be increased and the area of the base plate 120 can be reduced at the same time, so as to further achieve the purpose of miniaturization.

Please continue to refer to FIG. 3 and FIG. 4, in this embodiment, there is a gap formed between the first movable assembly 20 and the fixed component 10. Specifically, as shown in FIG. 3, the base plate 120 has a bottom surface 1201 perpendicular to the optical axis O and facing the first movable assembly 20. In addition, a gap G is formed between the circuit member body 1141 and the bottom surface 1201 of the base plate 120. That is, the first movable assembly 20 is held by the first driving assembly 30 and is suspended in the outer frame 102, so that when the first driving assembly 30 drives the circuit member body 1141 and the photosensitive element 122 to move along the XY plane, the circuit member body 1141 does not collide with the base plate 120.

As shown in FIG. 3, when viewed in a direction perpendicular to the optical axis O (for example, viewed along the Y-axis), the first segment SG1 partially overlaps the first movable assembly 20. For example, the first segment SG1 partially overlaps the first frame 118. Based on this structural design, the purpose of miniaturization can be achieved.

Further, as shown in FIG. 3, when viewed along the optical axis O, the first top surface S1 partially overlaps the first segment SG1. Moreover, two side openings 102S are formed on the outer frame 102 so that the movable cantilevers 1143 can pass through the side openings 102S to the outside of the outer frame 102. When the photosensitive element driving mechanism 100 is assembled, the side openings 102S of the outer frame 102 can assist the movable cantilevers 1143 to be positioned, thereby improving the overall structural strength and improving workability at the same time, making it easy to produce and assemble.

Figure 5:
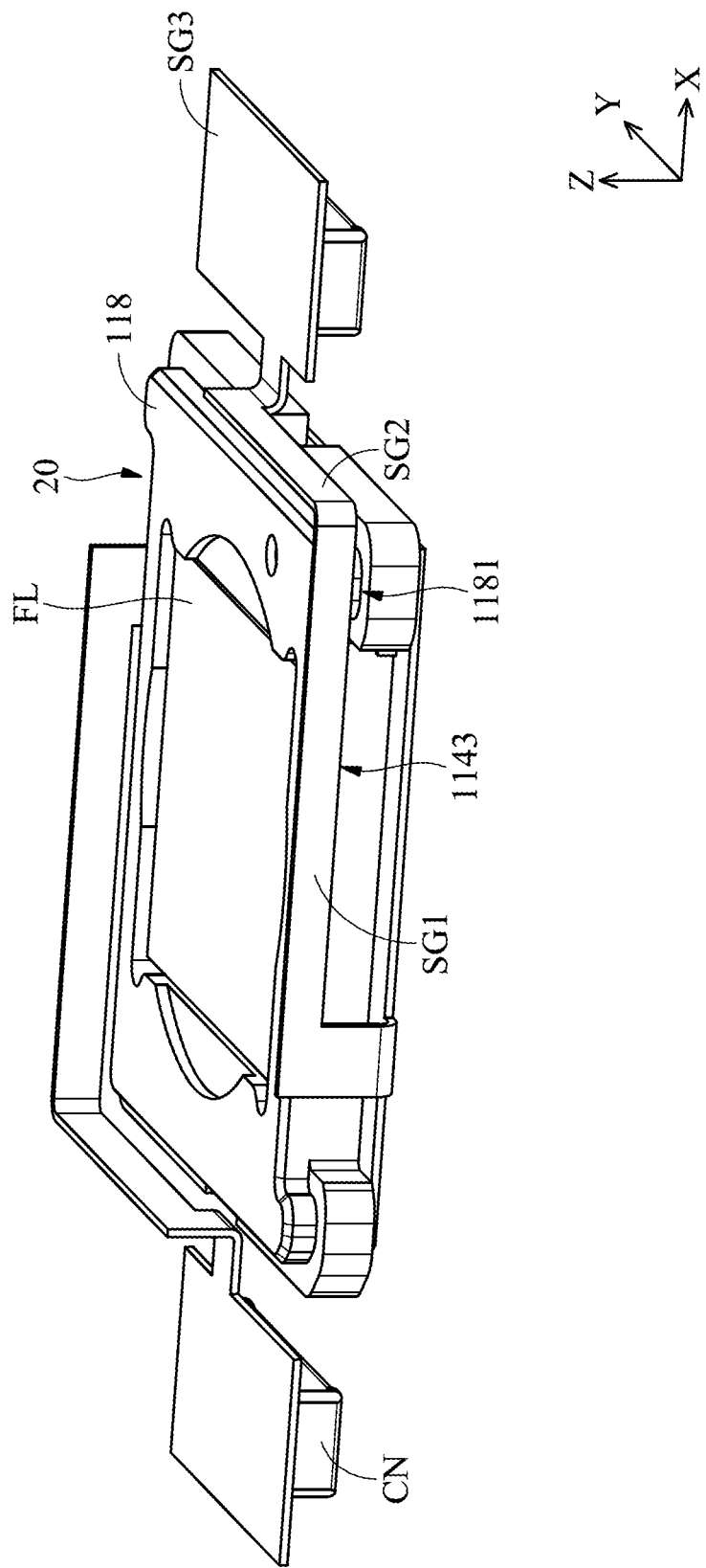
FIG. 5 is a schematic structural diagram of the first movable assembly 20 according to an embodiment of the present disclosure.

Next, please refer to FIG. 5, which is a schematic structural diagram of the first movable assembly 20 according to an embodiment of the present disclosure. As shown in FIG. 5, the first frame 118 has a recessed portion 1181 corresponding to the first segment SG1. Based on the design of the recessed portion 1181, when the circuit member body 1141 and the first frame 118 move along the X-axis or the Y-axis, the movable cantilever 1143 does not collide with the first frame 118, thereby preventing damage to the movable cantilever 1143.

Figure 6:
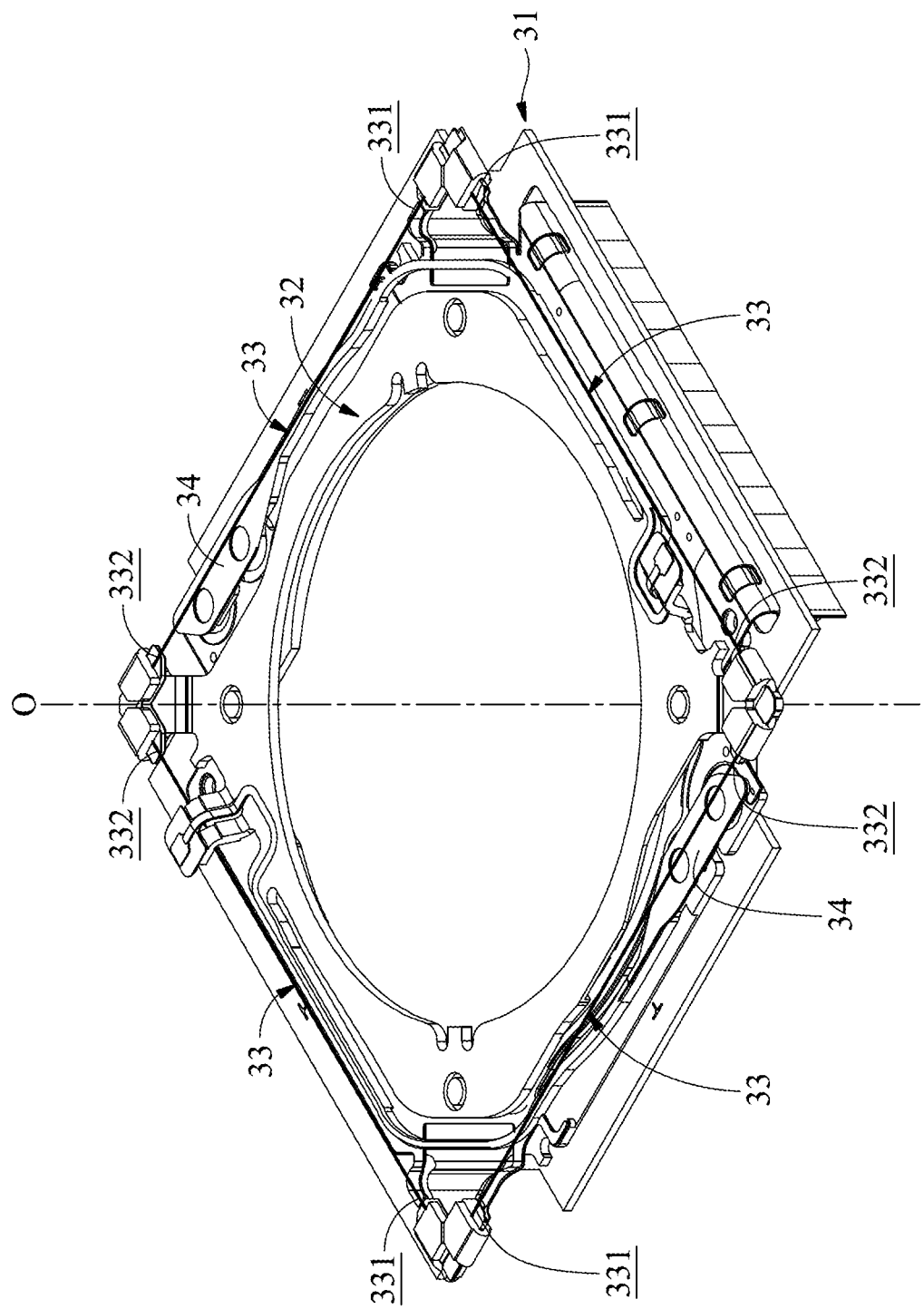
FIG. 6 is a schematic diagram of the first driving assembly 30 according to an embodiment of the present disclosure.

Next, please refer to FIG. 6, which is a schematic diagram of the first driving assembly 30 according to an embodiment of the present disclosure. In this embodiment, the first driving assembly 30 can include a first driving base 31, a second driving base 32, and a plurality of bias wires 33. The second driving base 32 is fixed to the bottom of the base 112 of the fixed assembly 10 (as shown in FIG. 3). In this embodiment, the second driving base 32 can be an annular structure and surround the optical axis O, and the second driving base 32 can extend along a plane perpendicular to the optical axis O.

The second driving base 32 is movably and/or rotatably disposed on the first driving base 31. In other words, the first driving base 31 is movable and/or rotatable relative to the second driving base 32. In this embodiment, the first driving base 31 can be an annular structure and surround the optical axis O. The first driving base 31 can extend along a plane perpendicular to the optical axis O. In addition, the first driving base 31 can be fixed to the first movable assembly 20. For example, in the embodiment, as shown in FIG. 3, the first driving base 31 can be fixed to the first frame 118.

A first end 331 of the bias wire 33 is connected to the first driving base 31, and a second end 332 of the bias wire 33 is connected to the second driving base 32. The connection of the bias wire 33 and the first driving base 31 and the connection of the bias wire 33 and the second driving base 32 can have a plurality of different designs, and they are not limited to the embodiment of the present disclosure.

In the present embodiment, the bias wires 33 may be made of shape memory alloys (SMA). For example, the material of the bias wires 33 may include titanium-nickel alloy (TiNi), titanium-palladium alloy (TiPd), titanium-nickel-copper alloy (TiNiCu), titanium-nickel-palladium alloy (TiNiPd), or a combination thereof, but it is not limited thereto. Therefore, when a voltage is supplied to the bias wire 33, the length of the bias wire 33 is changed. For example, when the voltage is greater, the temperature of the bias wire 33 is higher, and when the temperature of the bias wire 33 is higher, the length of the bias wire 33 is shorter.

Because the first end 331 of the bias wire 33 is connected to the first driving base 31, and the second end 332 of the bias wire 33 is connected to the second driving base 32, when the length of the bias wire 33 is shortened, a pulling force is generated by the bias wire 33 to move (or rotate) the first driving base 31 relative to the second driving base 32.

Because the photosensitive element 122 is disposed on the circuit member body 1141 of the circuit member 114, and the first frame 118 is fixed to the circuit member body 1141 and the first driving seat 31, the photosensitive element 122 can move with the first driving base 31. Based on the design of the first driving assembly 30 and the first movable assembly 20, the photosensitive element driving mechanism 100 can have the functions of optical image stabilization and shake compensation. Furthermore, because the first driving assembly 30 is implemented by a shape memory alloy, electromagnetic interference of the photosensitive element driving mechanism 100 can be reduced.

In addition, in this embodiment, the first driving assembly 30 can further include two spring sheets 34. One end of the spring sheet 34 is connected to the second driving base 32, and the other end of the spring sheet 34 can be connected to the first driving base 31. Therefore, when the first driving base 31 moves relative to the second driving base 32 and the voltage is stopped from being supplied to the bias wire 33, the spring sheet 34 can provide an elastic force to quickly return the first driving base 31 to an initial position.

It should be noted that, in some embodiments, the spring sheet 34 can serve as a conductive element. For example, an insulating layer may be formed on the surface of the spring sheet 34, and a plurality of electronic lines may be formed on the insulating layer for electrically connecting the spring sheet 34 to other components, such as the second driving assembly 50.

Figure 7:
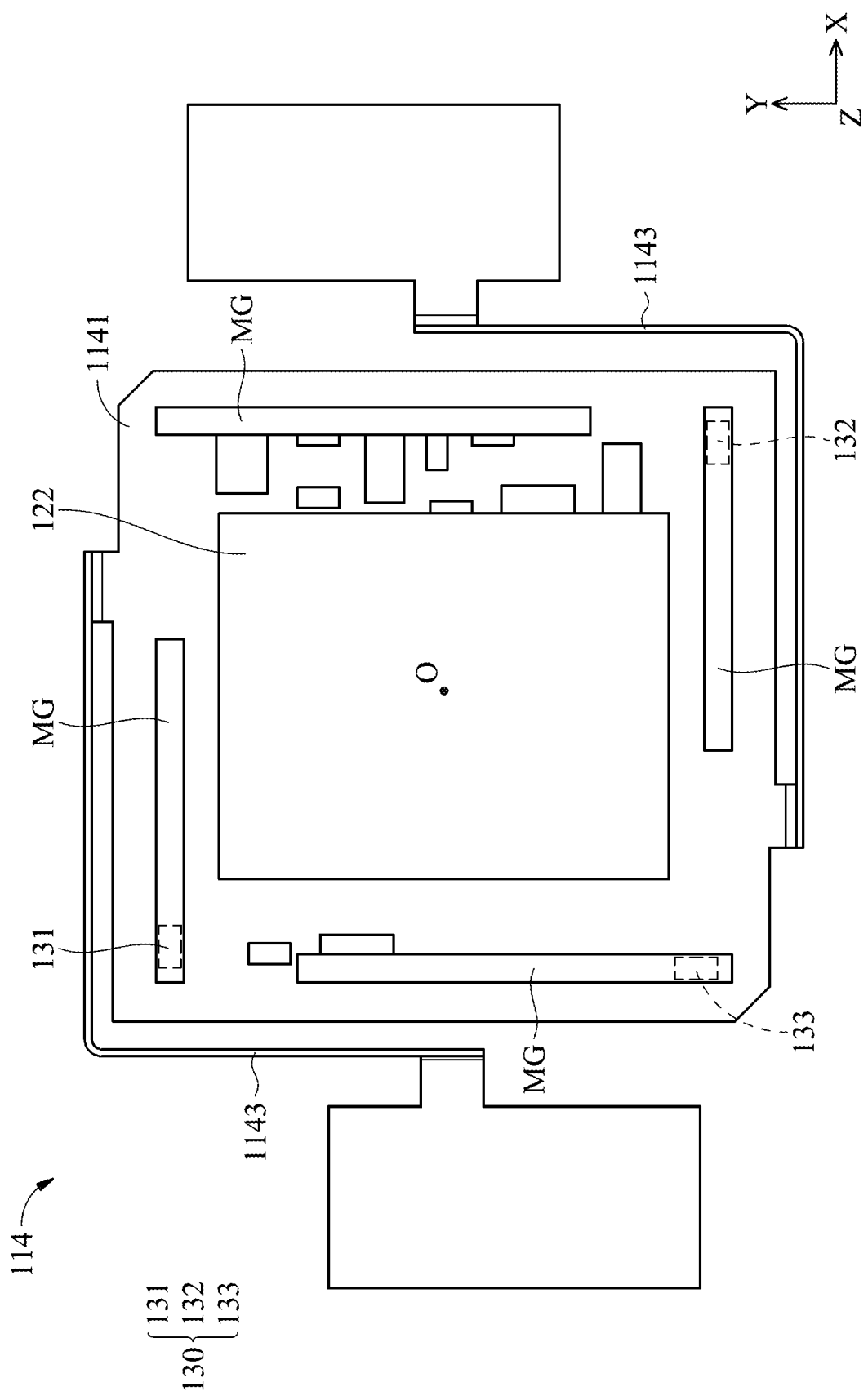
FIG. 7 is a top view of the circuit member 114 and the magnetic elements MG according to an embodiment of the present disclosure.

Next, please refer to FIG. 2 and FIG. 7. FIG. 7 is a top view of the circuit member 114 and the magnetic elements MG according to an embodiment of the present disclosure. In this embodiment, the photosensitive element driving mechanism 100 may further include a position sensing assembly 130 for sensing the motion of the first movable assembly 20 relative to the fixed assembly 10. In particular, the position sensing assembly 130 can have at least three magnetic sensors disposed on the circuit member body 1141 of the first movable assembly 10 and corresponding to the magnetic elements MG (the second driving magnetic component) of the second driving assembly 50. In this embodiment, the position sensing assembly 130 includes a magnetic sensor 131, a magnetic sensor 132, and a magnetic sensor 133. It should be noted that, as shown in FIG. 7, the second driving assembly 50 includes four magnetic elements MG and are arranged in a rotationally symmetrical form with respect to the optical axis O.

These magnetic sensors are configured to sense a change in the magnetic field of the corresponding magnetic elements MG, thereby sensing the motion of the photosensitive element 122 relative to the base 112 and the base plate 120. That is, the magnetic sensors can sense the movement of the photosensitive element 122 in the X-axis (or in the Y-axis) and the rotation around the Z-axis. For example, the magnetic sensor 131 and the magnetic sensor 132 sense the movement of the photosensitive element 122 along the Y-axis, and the magnetic sensor 133 senses the movement of the photosensitive element 122 along the X-axis.

In addition, the magnetic sensor 131, the magnetic sensor 132, and the magnetic sensor 133 can sense the rotation of the photosensitive element 122 around the Z axis, so as to further improve the accuracy of control.

The motion of the photosensitive element 122 relative to the fixed assembly 10 can be accurately sensed by disposing the position sensing assembly 130. In addition, based on the structural configuration of this embodiment, the purpose of miniaturization can also be achieved.

Figure 8:
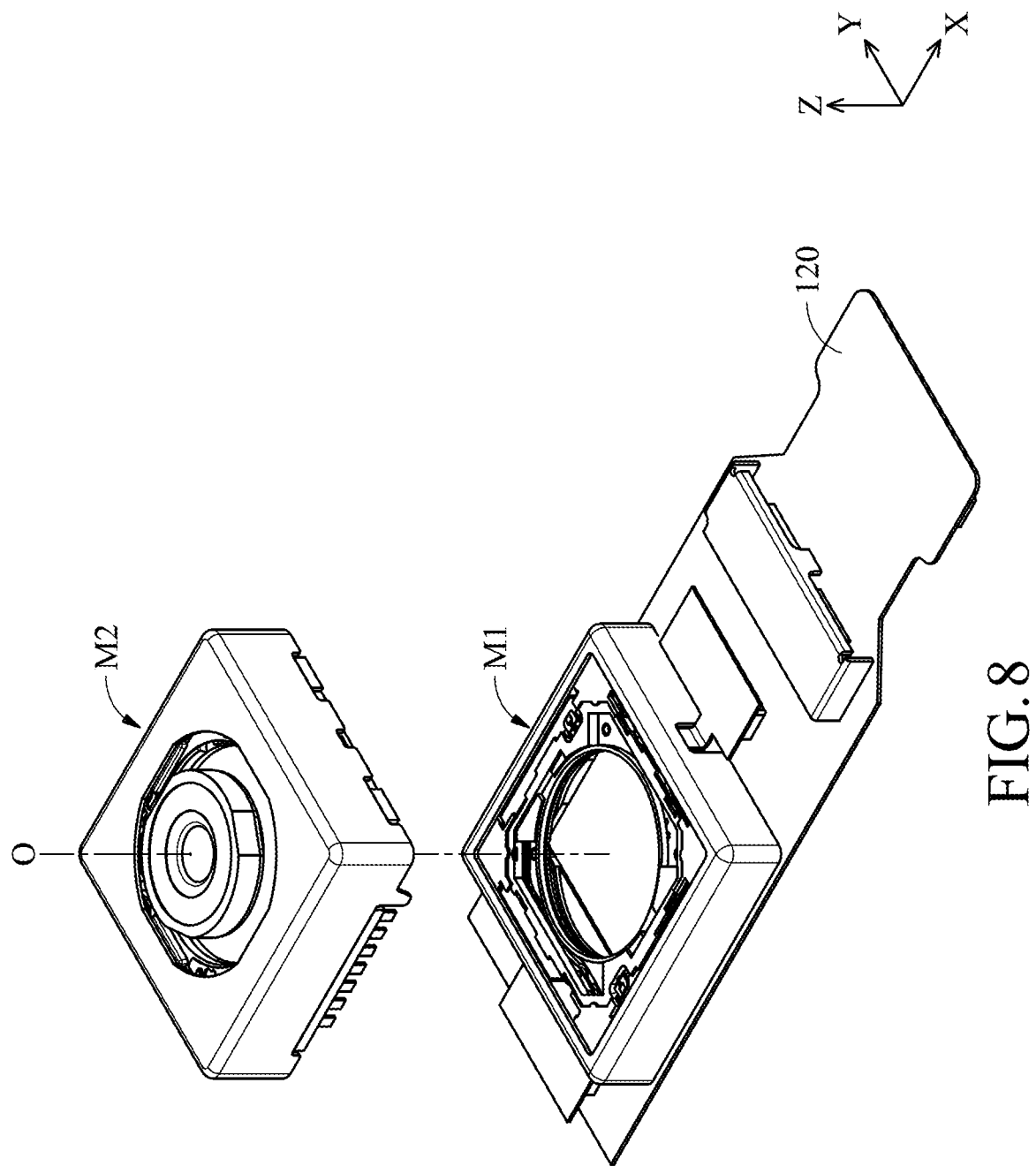
FIG. 8 is a schematic diagram of a photosensitive element driving mechanism 200 according to another embodiment of the present disclosure.
Figure 9:
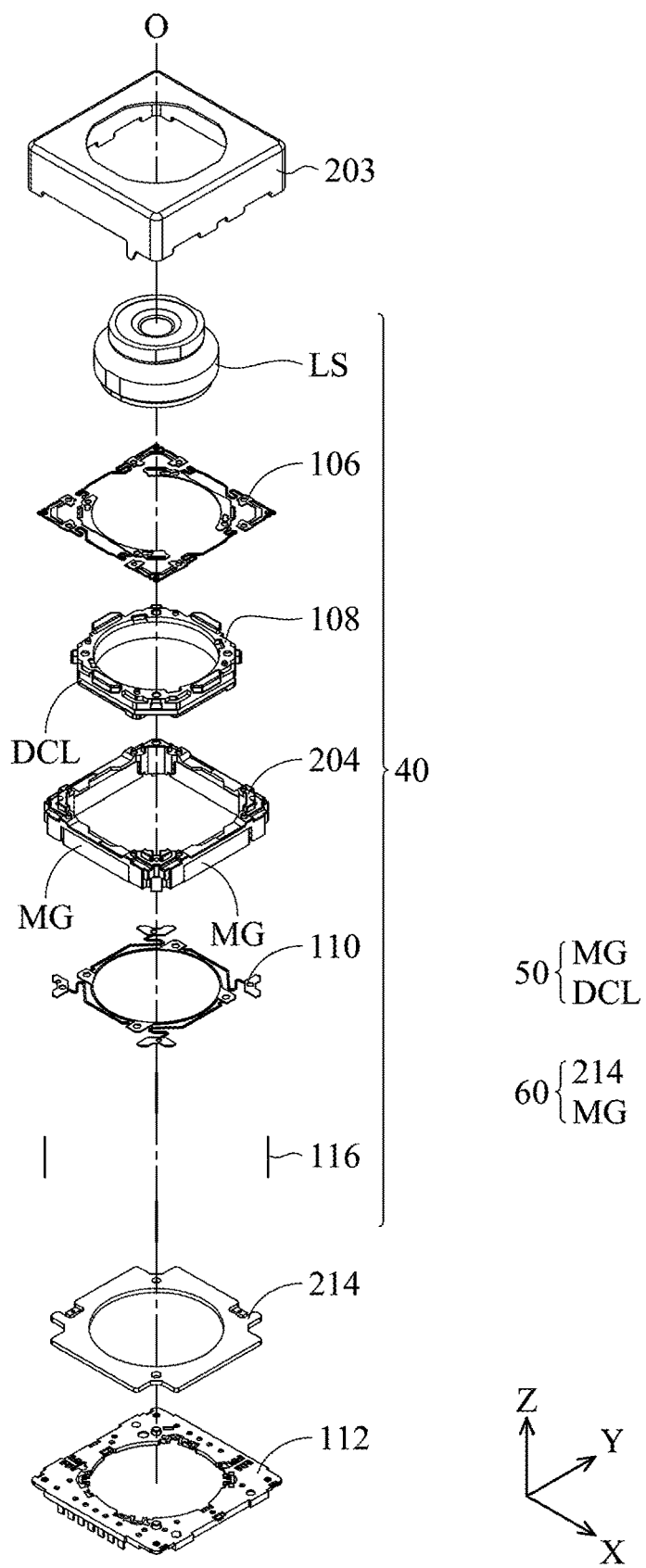
FIG. 9 is a partial exploded diagram of the photosensitive element driving mechanism 200 according to another embodiment of the present disclosure.
Figure 10:
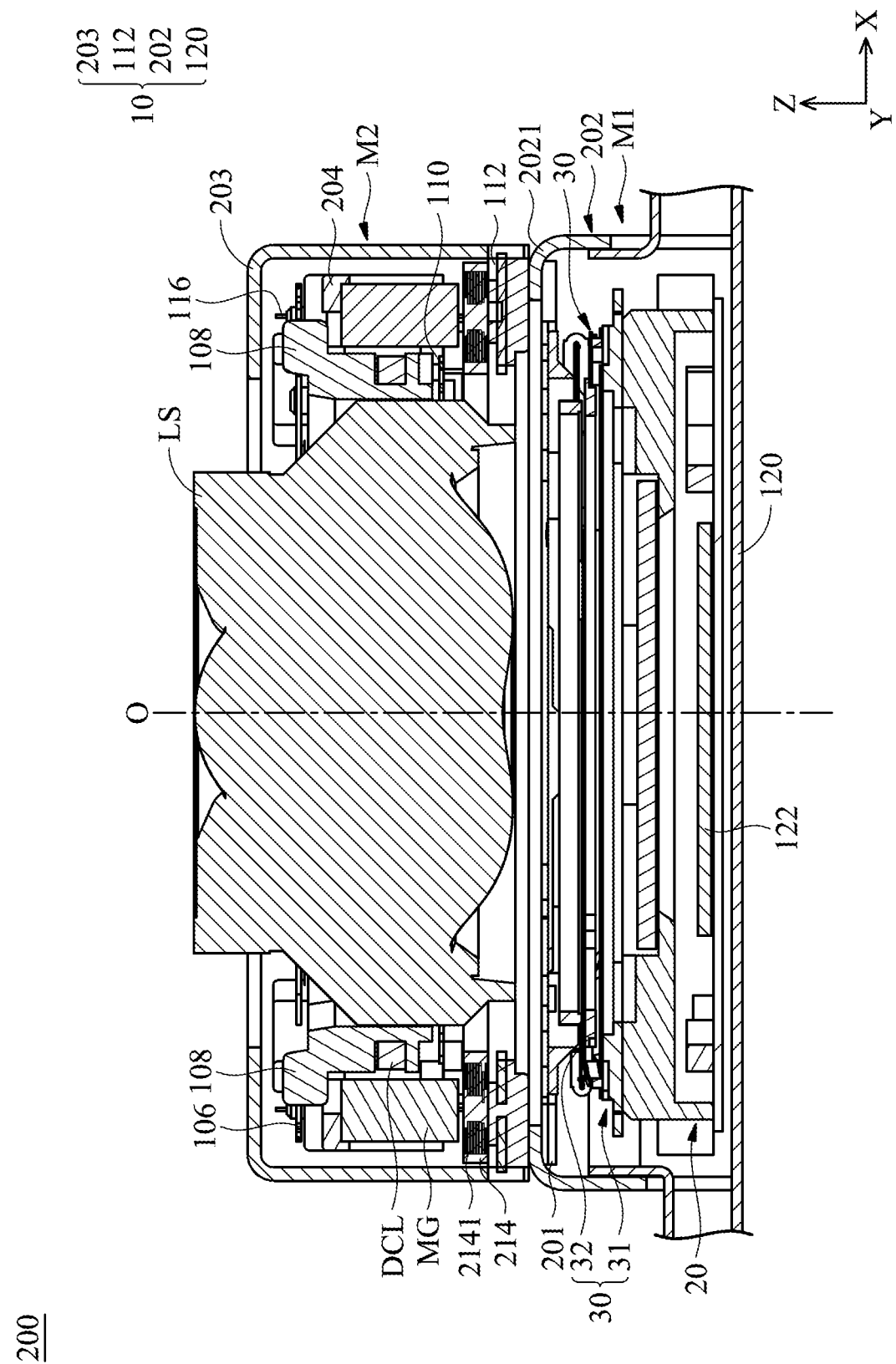
FIG. 10 is a cross-sectional view of the photosensitive element driving mechanism 200 according to another embodiment of the present disclosure.

Please refer to FIG. 8 to FIG. 10. FIG. 8 is a schematic diagram of a photosensitive element driving mechanism 200 according to another embodiment of the present disclosure, FIG. 9 is a partial exploded diagram of the photosensitive element driving mechanism 200 according to another embodiment of the present disclosure, and FIG. 10 is a cross-sectional view of the photosensitive element driving mechanism 200 according to another embodiment of the present disclosure. In this embodiment, the photosensitive element driving mechanism 200 includes a first module M1, a second module M2, and the base plate 120. The first module M1 is disposed on the base plate 120, and the second module M2 is disposed on the first module M1.

As shown in FIG. 10, the first module M1 includes an outer frame 202, and the outer frame 202 receives the first driving assembly 30, the first movable assembly 20, and a connecting member 201. The connecting member 201 is fixed to a top wall 2021 of the outer frame 202, and the second driving base 32 of the first driving assembly 30 is fixed to the outer frame 202 through the connecting member 201. Similar to the previous embodiments, the first movable assembly 20 is connected to the first driving base 31 of the first driving assembly 30 so that the first driving assembly 30 can drive the first movable assembly 20 (and the photosensitive element 122) to move relative to the base plate 120.

As shown in FIG. 9 and FIG. 10, the second module M2 includes a casing 203 fixedly connected to the base 112, and the base 112 is disposed on the outer frame 202. In addition, the second module M2 further includes the second movable assembly 40, the second driving assembly 50, and a third driving assembly 60. The second movable assembly 40 includes a frame 204, the holder 108, the first elastic member 106, the second elastic member 110, and a plurality of magnetic elements MG. The magnetic elements MG are fixed to the frame 204, and the holder 108 is configured to hold an optical component LS.

The outer ring portion of the first elastic member 106 is connected to the frame 204, and the outer ring portion of the second elastic member 110 is connected to the base 112. The inner ring portion of the first elastic member 106 and the inner ring portion of the second elastic member 110 is connected to the upper side and the lower side of the holder 108 so that the holder 108 is suspended within the frame 204. In addition, the second movable assembly 40 further includes four suspension wires 116. One end of the suspension wire 116 is connected to the first elastic member 106, and the other end of the suspension wire 116 is connected to the base 112, so that the frame 204 and the holder 108 can move along a second direction, for example, along the X-axis or the Y-axis. It should be noted that the second direction is not parallel to the first direction.

The third driving assembly 60 includes a circuit board 214 and magnetic elements MG, and the circuit board 214 has a third driving coil 2141 disposed between the first movable assembly 20 and the second movable assembly 40. When viewed in the direction of the optical axis O, the third driving coil 2141 partially overlaps the first movable assembly 20.

The third driving assembly 60 is configured to drive the second movable assembly 40 to move in the second direction relative to the fixed assembly 10. It should be noted that the third driving assembly 60 and the second driving assembly 50 share the magnetic elements MG, so that the purpose of miniaturization can be achieved. Furthermore, the third driving coil 2141 acts with the magnetic element MG to generate an electromagnetic driving force to drive the frame 204 and the holder 108 to move along the X-axis or the Y-axis with respect to the base 112, thereby further enhancing the effect of optical image stabilization.

It should be noted that, in this embodiment, the first driving assembly 30 is disposed between the third driving coil 2141 and the first movable assembly 20 for the purpose of miniaturization. In addition, similar to the first driving assembly 30 and the second driving assembly 50, the third driving assembly 60 can also be electrically connected to the circuit member 114, so as to be electrically connected to the base plate 120 and the control circuit CT thereon. Therefore, the control circuit CT can control the first driving assembly 30, the second driving assembly 50, and the third driving assembly 60.

The present disclosure provides a photosensitive element driving mechanism which has a first driving assembly 30 and a first movable assembly 20. The first movable assembly 20 is held by the first driving assembly 30 and is suspended in the outer frame 102 of the fixed assembly 10. The photosensitive element 122 is disposed on the circuit member 114 of the first movable assembly 20, and the first driving assembly 30 is configured to drive the circuit member 114 and the photosensitive element 122 to move relative to the fixed assembly 10, so as to achieve the purpose of optical image stabilization.

Furthermore, in some embodiments, the photosensitive element driving mechanism may further include a third driving assembly 60 configured to drive the holder 108 of the second movable assembly 40 and the optical component LS to move along the XY plane relative to the fixed assembly 10, so as to further enhance the effect of optical image stabilization.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:
1. An optical system, comprising:
a fixed assembly;

a first movable assembly, movable relative to the fixed assembly and configured to be connected to a photosensitive element having an optical axis, and the first movable assembly including:
  a circuit member, electrically connected to the photosensitive element, and the circuit member including:
    a circuit member body; and
    a movable cantilever assembly, wherein the circuit member body is movably connected to the fixed assembly through the movable cantilever assembly; and
a first driving assembly, configured to drive the first movable assembly to move relative to the fixed assembly;
wherein when viewed in a first direction perpendicular to the optical axis, a plurality of first segments of the movable cantilever assembly overlap at least a portion of the first movable assembly, each of the first segments has a long-strip shaped structure, and the first segments extend along the first direction.

2. The optical system as claimed in claim 1, wherein when viewed in the first direction, the first segments do not overlap each other.

3. The optical system as claimed in claim 2, wherein when viewed in the first direction, the first segments do not overlap the circuit member body.

4. The optical system as claimed in claim 3, wherein the circuit member further includes:
  a first surface, located at the circuit member body; and
  a plurality of second surfaces, respectively located at the first segments;
  wherein the first surface is continuously connected to the second surfaces without interruption, and the second surfaces face opposite directions.

5. The optical system as claimed in claim 4, wherein the first surface of the circuit member is not parallel to the second surfaces of the circuit member.

6. The optical system as claimed in claim 5, wherein the first surface is not parallel to the optical axis.

7. The optical system as claimed in claim 6, wherein all the second surfaces are parallel to the optical axis.

8. The optical system as claimed in claim 6, wherein the optical axis is not parallel to the first direction.

9. The optical system as claimed in claim 6, wherein the first movable assembly further includes a heat dissipation member connected to the circuit member body and configured to improve heat dissipation efficiency of the circuit member.

10. The optical system as claimed in claim 1, wherein the first segments are electrically connected to the photosensitive element and the fixed assembly, and there is a gap formed between the first movable assembly and the fixed assembly.

11. The optical system as claimed in claim 1, wherein the first driving assembly has a shape memory alloy.

12. The optical system as claimed in claim 11, wherein the optical system further includes a position sensing assembly configured to sense motion of the first movable assembly relative to the fixed assembly.

13. The optical system as claimed in claim 12, wherein the optical system further comprises:
  a second movable assembly, configured to hold an optical component, wherein the second movable assembly is movable relative to the fixed assembly; and
  a second driving assembly, configured to drive the second movable assembly to move relative to the fixed assembly, wherein the second driving assembly includes at least one second driving magnet component;
  wherein the position sensing assembly is disposed on the first movable assembly and corresponds to the second driving magnet component.

14. The optical system as claimed in claim 13, wherein the second driving magnet component is disposed on the fixed assembly, and the position sensing assembly includes at least three magnetic sensors configured to sense motion of the photosensitive element relative to a base plate of the fixed assembly.

15. The optical system as claimed in claim 1, wherein the first movable assembly further includes a first frame configured to accommodate the photosensitive element, and the first frame has a recessed portion corresponding to the first segments.

16. The optical system as claimed in claim 15, wherein the movable cantilever assembly further has a second segment, and the second segment and the first segments extend in different directions.

17. The optical system as claimed in claim 1, wherein the fixed assembly includes an outer frame, the outer frame has a first top surface facing the first movable assembly, and when viewed in a direction of the optical axis, the first top surface partially overlaps the first segments.

18. The optical system as claimed in claim 17, wherein the fixed assembly further includes a base, the first driving assembly is disposed between the base and the first movable assembly, and the base is disposed on the first top surface, wherein when viewed in the direction of the optical axis, the base partially overlaps the first top surface.

19. The optical system as claimed in claim 17, wherein the outer frame further has a second top surface, and a distance between the second top surface and the first movable assembly is greater than a distance between the first top surface and the first movable assembly.

20. The optical system as claimed in claim 17, wherein the outer frame further has a side wall parallel to the optical axis, and when viewed in the direction of the optical axis, the circuit member partially overlaps the side wall.

* * * * *